(12) United States Patent
Aksu et al.

(10) Patent No.: US 9,025,525 B2
(45) Date of Patent: May 5, 2015

(54) OVER-THE-TOP (OTT) VIDEO/VOICE CONFIGURATION

(75) Inventors: Arda Aksu, Martinez, CA (US); Lalit R. Kotecha, San Ramon, CA (US); Patricia R. Chang, San Ramon, CA (US); Deepak Kakadia, Union City, CA (US); Thomas W. Haynes, San Ramon, CA (US); Steven R. Rados, Danville, CA (US); Sanyogita Shamsunder, Basking Ridge, NJ (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 111 days.

(21) Appl. No.: 13/612,100

(22) Filed: Sep. 12, 2012

(65) Prior Publication Data

US 2014/0071889 A1 Mar. 13, 2014

(51) Int. Cl.
*H04W 40/00* (2009.01)
*H04L 29/06* (2006.01)

(52) U.S. Cl.
CPC ................................ *H04L 29/06278* (2013.01)

(58) Field of Classification Search
CPC ..... H04W 80/04; H04W 88/06; H04W 88/08; H04W 84/18; H04B 17/07; H04B 2201/70701; H04B 7/2628; H04J 13/00; H04J 13/16; H04G 10/10; H04G 10/107; H04Q 11/0478; H04L 47/10; H04L 12/5695
USPC ................. 370/328, 335, 230, 252, 389, 401; 709/205–206, 224, 238; 455/436
See application file for complete search history.

(56) References Cited

U.S. PATENT DOCUMENTS

| | | | |
|---|---|---|---|
| 2009/0209255 A1* | 8/2009 | Lassers et al. | 455/436 |
| 2013/0054701 A1* | 2/2013 | Leeder et al. | 709/205 |
| 2013/0080538 A1* | 3/2013 | McEachern et al. | 709/206 |
| 2013/0208729 A1* | 8/2013 | Evans et al. | 370/401 |
| 2014/0020060 A1* | 1/2014 | Kotecha et al. | 726/3 |

\* cited by examiner

*Primary Examiner* — Kwang B Yao
*Assistant Examiner* — Syed M Bokhari

(57) ABSTRACT

A user equipment (UE) provides for display, to a user, information identifying available over-the-top (OTT) services provided via voice-over-Long-Term Evolution (VoLTE), and receives, from the user, a selection of a particular OTT service of the available OTT services. The UE receives, from the user, information identifying a selected contact associated with the particular OTT service, and determines whether a particular UE associated with the selected contact is a VoLTE capable device or a non-VoLTE capable device. The UE provides a call to the particular UE, via a LTE network and an Internet protocol (IP) Multimedia Subsystem (IMS) network, when the particular UE is a VoLTE capable device.

20 Claims, 11 Drawing Sheets

OVER-THE-TOP (OTT) VIDEO/VOICE CONFIGURATION

BACKGROUND

Over-the-top (OTT) content includes the on-line delivery of video and audio (e.g., voice) without an Internet service provider involved in the control or distribution of the content. The Internet service provider may be aware of the content of Internet protocol (IP) packets associated with the OTT content, but may not responsible for, nor able to control, viewing abilities, copyrights, and/or other redistribution of the OTT content. This is in contrast to delivery based on purchase or rental of video or audio content (over IP) from the Internet service provider, such as video on demand (VoD) over IP. One type of OTT content is OTT video/voice calling provided by services, such as Skype, Google Voice, FaceTime, Tango, etc. Such services enable users (e.g., via user equipment (UEs)) to communicate with other users by voice, video, videoconferencing, instant messaging, and file transferring over the Internet.

DETAILED DESCRIPTION OF PREFERRED EMBODIMENTS

The following detailed description refers to the accompanying drawings. The same reference numbers in different drawings may identify the same or similar elements.

OTT video/voice calling services may not perform well over wireless networks due to inefficient use of network resources provided in the wireless networks. For example, such services may experience poor quality of service (QoS), dropped calls, etc. due to the inefficient use of wireless network resources. However, wireless network data rates have vastly improved using fourth generation (4G) technologies, such as Long-Term Evolution (LTE). Voice-over-LTE (VoLTE) is a service provided by a LTE network and is based on the IP Multimedia Subsystem (IMS) network. VoLTE provides specific profiles for control and media planes of a video/voice service on the LTE network. VoLTE delivers the video/voice service (e.g., the control and media planes) as data flows within a LTE data bearer.

Systems and/or methods described herein may enable a UE to provide a variety of OTT video/voice calling services via a VoLTE client residing on the UE. The VoLTE client may ensure that an OTT video/voice call is routed using VoLTE network resources provided by a LTE network and an IMS network. The VoLTE network resources may utilize significantly less resources to route the OTT video/voice call than is typically used to route such calls. The VoLTE client may utilize less data (e.g., bits) and may provide improved QoS for the OTT video/voice call than is typically used for OTT video/voice calls.

Figure 1:
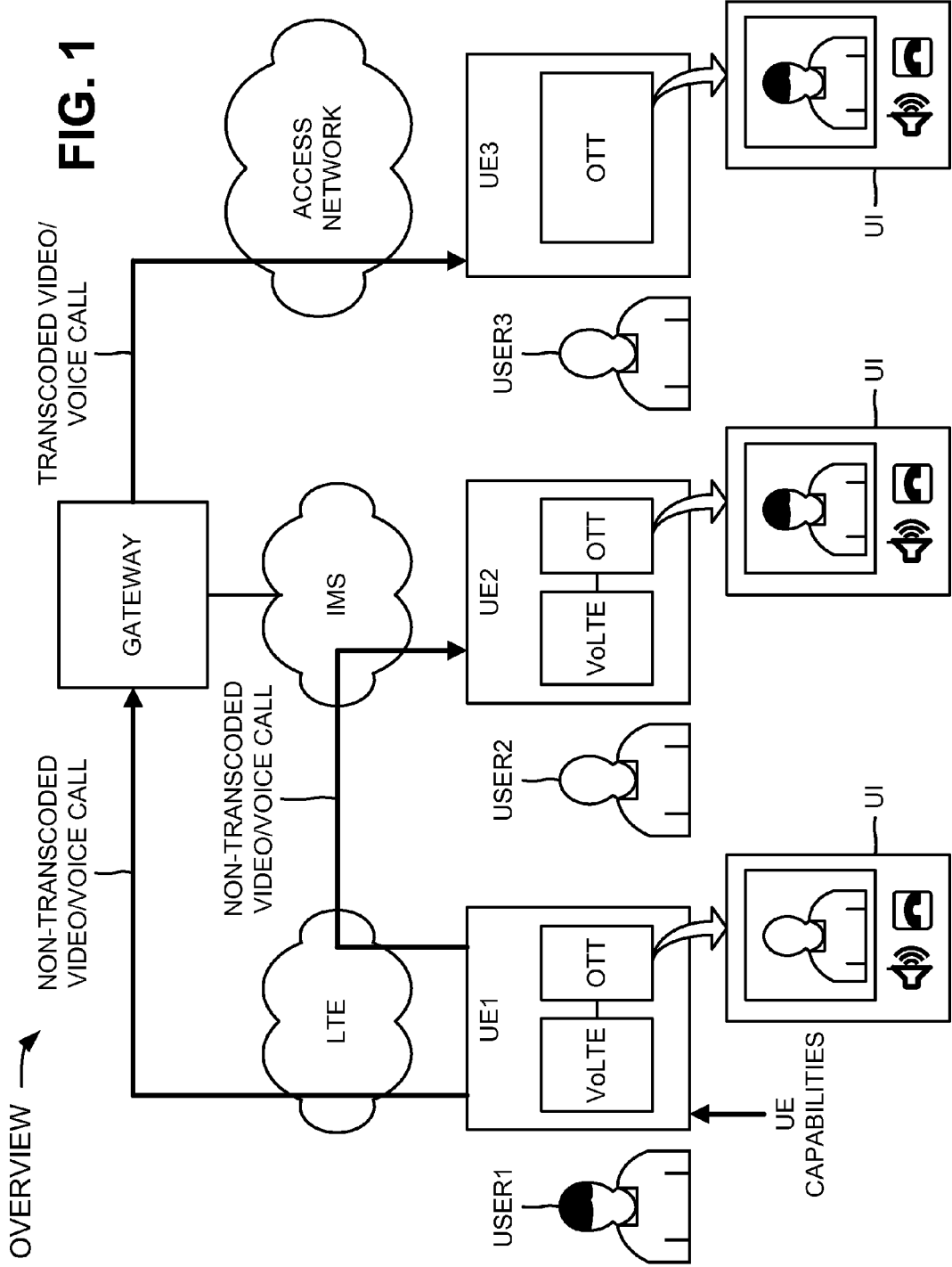
FIG. 1 is a diagram of an overview of an example implementation described herein.

FIG. 1 is a diagram of an overview of an example implementation described herein. As shown, three UEs may be connected to one or more of a LTE network, an IMS network, a gateway, and an access network.

Each of the UEs may include a radiotelephone, a personal communications system (PCS) terminal, a smart phone, a personal digital assistant (PDA), or other types of mobile communication devices. The LTE network may include a communications network that connects a user (e.g., the first UE) to a service provider or other users (e.g., the second and third UEs). The IMS network may include an architectural framework or network (e.g., a telecommunications network) for delivering IP multimedia services. The gateway may include one or more network devices that transfer traffic and perform control plane mapping and/or transcoding on the traffic. The gateway may be connected to the IMS network. The access network may include a radio access network operating under wireless protocols other than LTE standards.

As further shown in FIG. 1, a first UE (UE1) may be associated with a first user (USER1), and may include a VoLTE client and an OTT client. The VoLTE client may receive information associated with capabilities of a second UE (UE2) and a third UE (UE3). The capabilities information may include status information associated with a second user (USER2) and a third user (USER3) (e.g., whether or not the second user and/or the third user are logged into the service provided by the OTT client); information indicating whether or not the second UE and/or the third UE are VoLTE capable (e.g., include the VoLTE client); etc. The VoLTE client may store the capabilities information in the first UE.

The VoLTE client may cause the first UE to display, to the first user and via a user interface (UI), OTT video/voice services available via VoLTE. The VoLTE client may receive, from the first user, selection of a particular one of the OTT video/voice services available via VoLTE. For example, the first user may select the OTT client as the particular OTT video/voice service. The OTT client may cause the first UE to display a list of contacts associated with the OTT client and the first user. The OTT client may receive, from the first user, a selection of a contact from the list of contacts. In one example, the first user may select the second user from the list of contacts. The VoLTE client may retrieve the capabilities information, and may determine network capabilities of the second UE, associated with the selected second user, based on the capabilities information.

Since the second UE includes a VoLTE client, the VoLTE client of the first UE may determine that the second UE is a VoLTE capable device. If the first user wishes to generate an OTT video and/or voice call with the second user, the VoLTE client may cause the first UE to provide a non-transcoded video/voice call to the second UE via the LTE network and the IMS network. In one example, the non-transcoded video/voice call may include a particular video/voice codec that may be received and understood by the VoLTE client of the second UE. The LTE network and the IMS network may utilize significantly less network resources to route the video/voice call than is typically used to route such calls. The VoLTE client may utilize less data (e.g., bits) and may provide improved QoS for the video/voice call. Once the video/voice call is established between the first UE and the second UE, the OTT client may cause the first UE to display a live (e.g., in real time) video (e.g., via the user interface) of the second user, and to provide a live voice of the second user to the first user. Similarly, the OTT client may cause the second UE to display a live video of the first user (e.g., via a user interface), and to provide a live voice of the first user to the second user.

Alternatively, or additionally, the first user may select the third user from the list of contacts. The VoLTE client may determine network capabilities of the third UE, associated with the selected third user, based on the capabilities information. Since the third UE does not include a VoLTE client, the VoLTE client of the first UE may determine that the third UE is a non-VoLTE capable device. If the first user wishes to generate an OTT video/voice call with the third user, the VoLTE client may cause the first UE to provide a non-transcoded video/voice call to the third UE via the LTE network, the gateway, and the access network. The gateway may receive the non-transcoded video/voice call, and may generate a transcoded video/voice call that may be understood by the OTT client of the third UE. Once the video/voice call is established between the first UE and the third UE, the OTT client may cause the first UE to display a live video (e.g., via the user interface) of the third user, and to provide a live voice of the third user to the first user. Similarly, the OTT client may cause the third UE to display a live video of the first user (e.g., via a user interface), and to provide a live voice of the first user to the third user.

As used herein, the term "user" is intended to be broadly interpreted to include a UE, or a user of a UE.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 2:
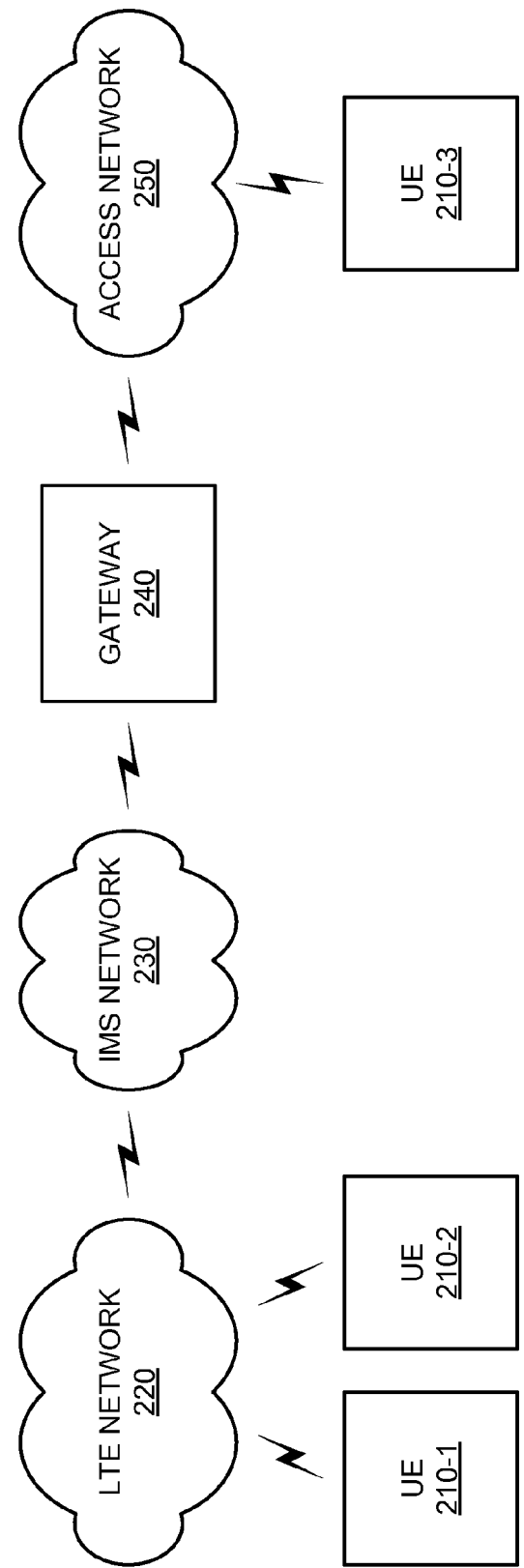
FIG. 2 is a diagram of an example environment in which systems and/or methods described herein may be implemented.

FIG. 2 is a diagram of an example environment 200 in which systems and/or methods described herein may be implemented. As illustrated, environment 200 may include UEs 210-1, 210-2, and 210-3 (collectively referred to herein as UEs 210, and, in some instances, singularly as UE 210), a LTE network 220, an IMS network 230, a gateway 240, and an access network 250. Devices of environment 200 may connect via wired and/or wireless connections or links. Three UEs 210, a single LTE network 220, a single IMS network 230, a single gateway 240, and a single access network 250 have been illustrated in FIG. 2 for simplicity. In practice, there may be more UEs 210, LTE networks 220, IMS networks 230, gateways 240, and/or access networks 250.

UE 210 may include a radiotelephone, a PCS terminal (e.g., that may combine a cellular radiotelephone with data processing and data communications capabilities), a smart phone, a PDA (e.g., that can include a radiotelephone, a pager, Internet/intranet access, etc.), a laptop computer (e.g., with a wireless air card), a tablet computer, a machine-to-machine (M2M) device, or other types of mobile computation and communication devices. Alternatively, or additionally, UE 210 may include a fixed computation and communication device, such as a personal computer, a set top box (STB), a gaming system, etc. In an example implementation, UE 210 may include a device that is capable of communicating with other UEs, LTE network 220, IMS network 230, gateway 240, and/or access network 250.

LTE network 220 may include a communications network that connects subscribers (e.g., UE 210) to other UEs. In one example, LTE network 220 may include a WiFi network or other access networks (e.g., an evolved universal terrestrial radio access network (E-UTRAN) or an enhanced high-rate packet data (eHRPD) network). Alternatively, or additionally, LTE network 220 may include a radio access network capable of supporting high data rate, low latency, packet optimization, large capacity and coverage, etc. LTE network 220 may include one or more network resources (e.g., eNodeBs) that transmit and/or receive traffic to and/or from UEs 210.

IMS network 230 may include an architectural framework or network (e.g., a telecommunications network) for delivering IP multimedia services. In one example, IMS network 230 may include one or more network resources, such as, for example, a home subscriber server (HSS). The HSS may include a master user database that supports devices of IMS network 230 that handle calls. The HSS may contain subscription-related information (e.g., user profiles), may perform authentication and authorization of a user, and may provide information about a user's location and IP information.

Gateway 240 may include one or more computation and communication devices that gather, process, and/or provide information in a manner described herein. For example, gateway 240 may include one or more server devices, network devices (e.g., gateways, routers, switches, firewalls, network interface cards (NICs), hubs, bridges, optical add-drop multiplexers (OADMs), etc.), etc. In an example implementation, gateway 240 may receive non-transcoded content (e.g., video, audio, etc.) from UE 210, via LTE network 220. Gateway 240 may perform control plane mapping and transcoding on the content to produce control plane mapped and transcoded content in a format that may be processed by another UE 210 associated with access network 250. Gateway 240 may provide the control plane mapped/transcoded content to the other UE 210, via access network 250. Gateway 240 may connect to IMS network 230 so that when an OTT application is used to connect to or from access network 250, gateway 240 may provide transcoding functionality. For example, gateway 240 may provide mapping for non-IMS call signaling to IMS call signaling.

Access network 250 may include a radio access network operating under wireless protocols other than LTE standards. For example, access network 250 may include an access network conforming to other network protocols, such as, for example, Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), etc.

Although FIG. 2 shows example devices of environment 200, in other implementations, environment 200 may include fewer devices, different devices, differently arranged devices, or additional devices than depicted in FIG. 2. Alternatively, or additionally, one or more devices of environment 200 may perform one or more tasks described as being performed by one or more other devices of environment 200.

Figure 3:
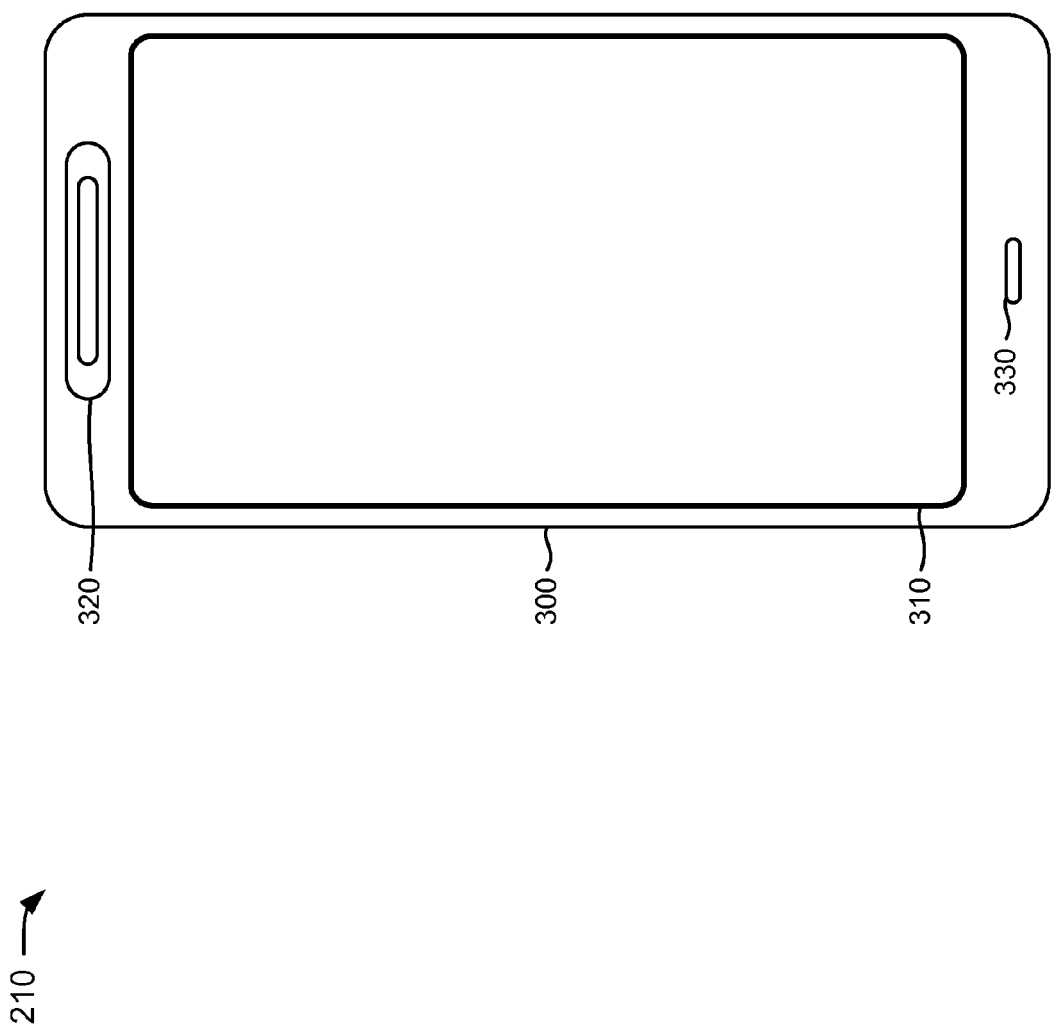
FIG. 3 is a diagram of example external components of a user equipment (UE) of the environment depicted in FIG. 2.

FIG. 3 is a diagram of example external components of UE 210 (FIG. 2). As shown, UE 210 may include a housing 300, a display 310, a speaker 320, and/or a microphone 330.

Housing 300 may protect the components of UE 210 from outside elements. Housing 300 may include a structure configured to hold devices and components used in UE 210, and may be formed from a variety of materials. For example, housing 300 may be formed from plastic, metal, a composite, etc., and may be configured to support display 310, speaker 320, and/or microphone 330.

Display 310 may provide visual information to the user. For example, display 310 may display text input into UE 210, text, images, video, and/or graphics received from another device, and/or information regarding incoming or outgoing calls or text messages, emails, media, games, phone books, address books, the current time, etc. In one implementation, display 310 may include a touch screen display that may be configured to receive a user input when the user touches display 310. For example, the user may provide an input to display 310 directly, such as via the user's finger, or via other input objects, such as a stylus. User inputs received via display 310 may be processed by components and/or devices operating in UE 210. The touch screen display may permit the user to interact with UE 210 in order to cause UE 210 to perform one or more operations.

Speaker 320 may provide audible information to a user of UE 210. Speaker 320 may be located in an upper portion of UE 210, and may function as an ear piece when a user is engaged in a communication session using UE 210. Speaker 320 may also function as an output device for music and/or audio information associated with games and/or video images played on UE 210.

Microphone 330 may receive audible information from the user. Microphone 330 may include a device that converts speech or other acoustic signals into electrical signals for use by UE 210. Microphone 330 may be located proximate to a lower side of UE 210.

Figure 4:
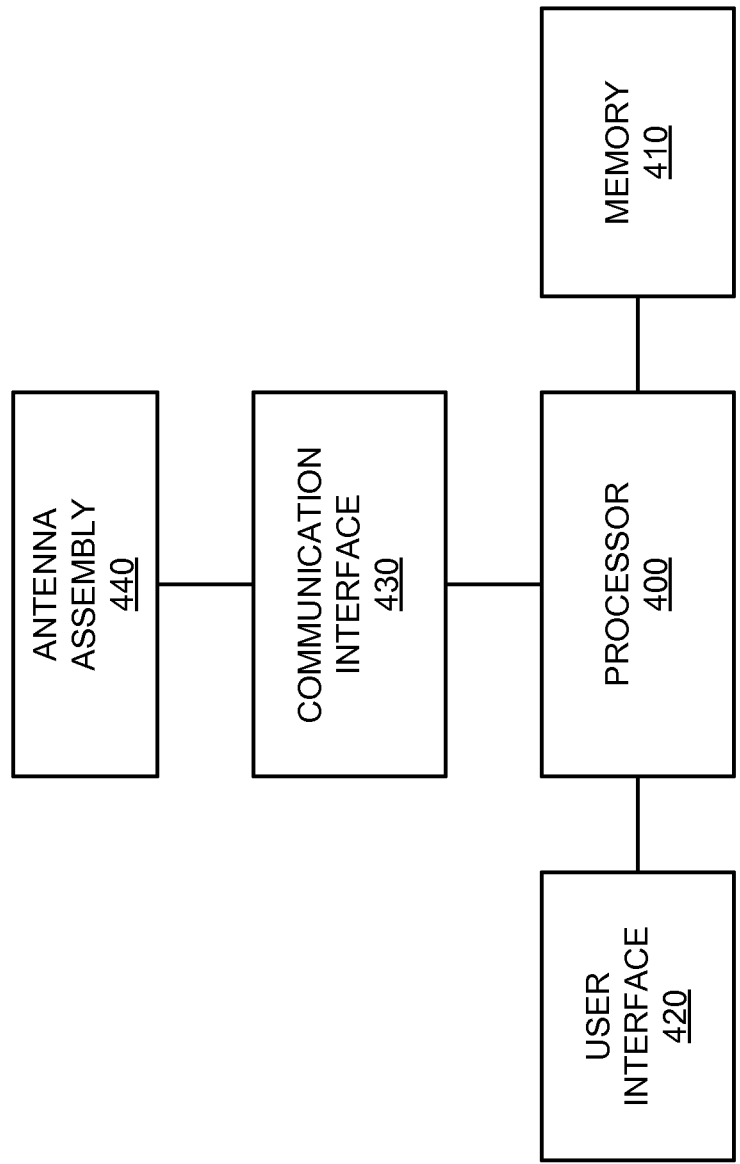
FIG. 4 is a diagram of example internal components of the UE of FIG. 3.

FIG. 4 is an example diagram of internal components of UE 210 (FIG. 2). As illustrated, UE 210 may include a processor 400, memory 410, a user interface 420, a communication interface 430, and/or an antenna assembly 440.

Processor 400 may include one or more processors or microprocessors that interpret and execute instructions. Alternatively, or additionally, processor 400 may be implemented as or include one or more ASICs, FPGAs, or the like.

Memory 410 may include a RAM or another type of dynamic storage device that stores information and instructions for execution by processor 400, a ROM or another type of static storage device that stores static information and instructions for processor 400, and/or some other type of magnetic or optical recording medium and its corresponding drive for storing information and/or instructions.

User interface 420 may include mechanisms for inputting information to UE 210 and/or for outputting information from UE 210. Examples of input and output mechanisms might include buttons (e.g., control buttons, keys of a keypad, a joystick, etc.) or a touch screen interface (e.g., display 310) to permit data and control commands to be input into UE 210; a speaker (e.g., speaker 320) to receive electrical signals and output audio signals; a microphone (e.g., microphone 330) to receive audio signals and output electrical signals; a display (e.g., display 310) to output visual information (e.g., text input into UE 210); a vibrator to cause UE 210 to vibrate; etc.

Communication interface 430 may include, for example, a transmitter that may convert baseband signals from processor 400 to radio frequency (RF) signals and/or a receiver that may convert RF signals to baseband signals. Alternatively, communication interface 430 may include a transceiver to perform functions of both a transmitter and a receiver. Communication interface 430 may connect to antenna assembly 440 for transmission and/or reception of the RF signals.

Antenna assembly 440 may include one or more antennas to transmit and/or receive RF signals over the air. Antenna assembly 440 may, for example, receive RF signals from communication interface 430 and transmit them over the air, and receive RF signals over the air and provide them to communication interface 430. In one implementation, for example, communication interface 430 may communicate with a network and/or devices connected to a network.

As described herein, UE 210 may perform certain operations in response to processor 400 executing software instructions contained in a computer-readable medium, such as memory 410. A computer-readable medium may be defined as a non-transitory memory device. A memory device may include space within a single physical memory device or spread across multiple physical memory devices. The software instructions may be read into memory 410 from another computer-readable medium, or from another device via communication interface 430. The software instructions contained in memory 410 may cause processor 400 to perform processes described herein. Alternatively, hardwired circuitry may be used in place of or in combination with software instructions to implement processes described herein. Thus, implementations described herein are not limited to any specific combination of hardware circuitry and software.

Although FIGS. 3 and 4 show example components of UE 210, in other implementations, UE 210 may include fewer components, different components, differently arranged components, or additional components than depicted in FIGS. 3 and/or 4. Alternatively, or additionally, one or more components of UE 210 may perform one or more other tasks described as being performed by one or more other components of UE 210.

Figure 5:
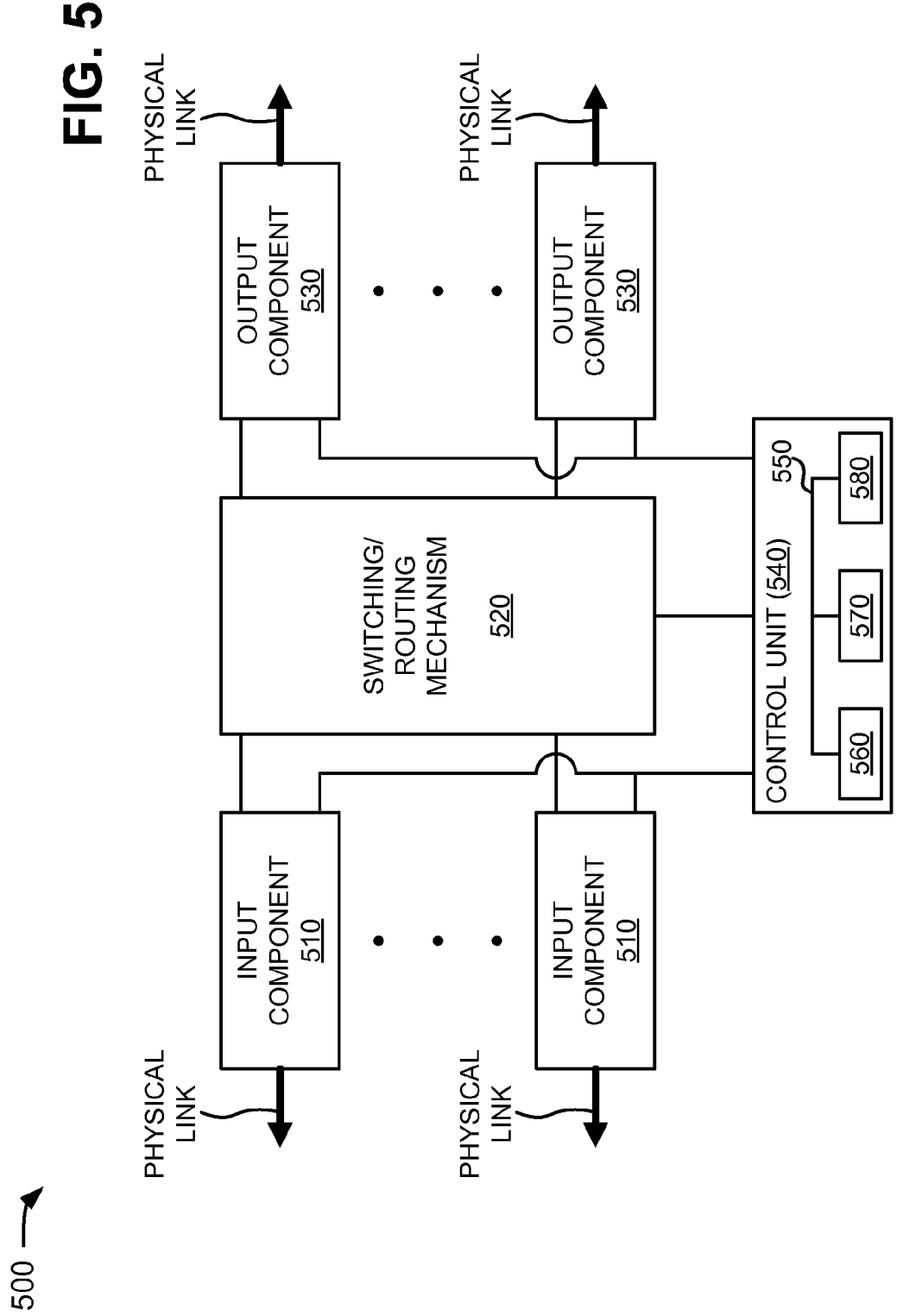
FIG. 5 is a diagram of example components of a gateway of the environment depicted in FIG. 2.

FIG. 5 is a diagram of example components of a device 500 that may correspond to gateway 240 (FIG. 2). In one example implementation, gateway 240 may include one or more devices 500 or one or more components of device 500. As illustrated, device 500 may include input components 510, a switching/routing mechanism 520, output components 530, and a control unit 540.

Input components 510 may be a point of attachment for physical links and may be a point of entry for incoming traffic, such as packets. Input components 510 may process incoming traffic, such as by performing data link layer encapsulation or decapsulation. In an example implementation, input components 510 may send and/or receive packets.

Switching/routing mechanism 520 may connect input components 510 with output components 530. Switching/routing mechanism 520 may be implemented using many different techniques. For example, switching/routing mechanism 520 may be implemented via busses, via crossbars, and/or with shared memories. The shared memories may act as temporary buffers to store traffic from input components 510 before the traffic is eventually scheduled for delivery to output components 530.

Output components 530 may store packets and may schedule packets for service on output physical links. Output components 530 may include scheduling algorithms that support priorities and guarantees. Output components 530 may support data link layer encapsulation and decapsulation, and/or a variety of higher-level protocols. In an example implementation, output components 530 may send packets and/or receive packets.

Control unit 540 may use routing protocols and one or more forwarding tables for forwarding packets. Control unit 540 may connect with input components 510, switching/ routing mechanism 520, and output components 530. Control unit 540 may compute a forwarding table, implement routing protocols, and/or execute software to configure and manage device 500. Control unit 540 may determine routing for any packet whose destination address may not be found in the forwarding table.

In an example implementation, control unit 540 may include a bus 550 that may include a path that permits communication among a processor 560, a memory 570, and a communication interface 580. Processor 560 may include one or more processors, microprocessors, ASICs, FPGAs, or other types of processing units that may interpret and execute instructions. Memory 570 may include a RAM, a ROM device, a magnetic and/or optical recording medium and its corresponding drive, and/or another type of static and/or dynamic storage device that may store information and instructions for execution by processor 560. Memory 570 may also temporarily store incoming traffic (e.g., a header of a packet or an entire packet) from input components 510, for processing by processor 560, before a packet is directed back to switching/routing mechanism 520, transported by switching/routing mechanism 520, and eventually scheduled to be sent to output components 530. Communication interface 580 may include any transceiver-like mechanism that enables control unit 540 to communicate with other devices and/or systems.

As described herein, device 500 may perform certain operations in response to processor 560 executing software instructions contained in a computer-readable medium, such as memory 570. The software instructions may be read into memory 570 from another computer-readable medium, such as a data storage device, or from another device via communication interface 580. The software instructions contained in memory 570 may cause processor 560 to perform processes described herein. Alternatively, hardwired circuitry may be used in place of or in combination with software instructions to implement processes described herein. Thus, implementations described herein are not limited to any specific combination of hardware circuitry and software.

Although FIG. 5 shows example components of device 500, in other implementations, device 500 may include fewer components, different components, differently arranged components, or additional components than depicted in FIG. 5. Alternatively, or additionally, one or more components of device 500 may perform one or more other tasks described as being performed by one or more other components of device 500.

Figure 6:
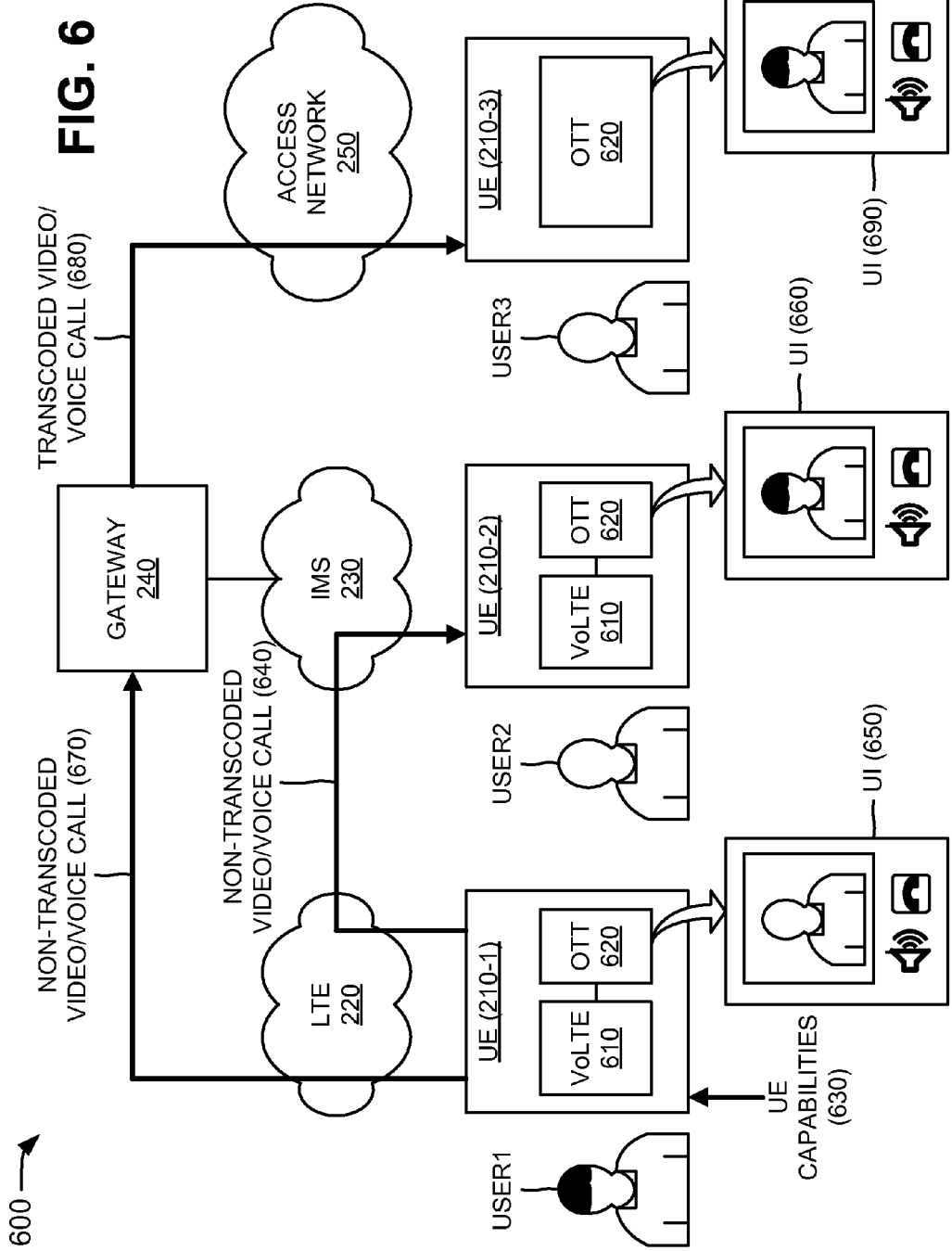
FIG. 6 is a diagram of example operations capable of being performed by an example portion of the environment illustrated in FIG. 2.

FIG. 6 is a diagram of example operations capable of being performed by an example portion 600 of environment 200 (FIG. 2). As shown in FIG. 6, environment portion 600 may include UEs 210-1, 210-2, and 210-3, LTE network 220, IMS network 230, gateway 240, and access network 250. UEs 210, LTE network 220, IMS network 230, gateway 240, and access network 250 may include the features described above in connection with one or more of, for example, FIGS. 1-5.

As further shown in FIG. 6, UE 210-1 may be associated with a first user (USER1), and may include a VoLTE client 610 and an OTT client 620. VoLTE client 610 may include a mechanism that enables UE 210-1 to offer one or more OTT video/voice services (e.g., OTT clients 620) via LTE-based network resources (e.g., resources associated with LTE network 220, IMS network 230, etc.). OTT client 620 may enable UE 210-1 to perform one or more OTT video/voice services, such as Skype, Google Voice, FaceTime, Tango, etc. OTT client 620 may enable users (e.g., via UEs 210) to communicate with other users by voice, video, videoconferencing, instant messaging, and file transferring over the Internet.

VoLTE client 610 may receive information 630 associated with capabilities of UE 210-2 and UE 210-3. In one example, VoLTE client 610 may receive capabilities information 630 from a presence server. Capabilities information 630 may include status information associated with a second user (USER2) and a third user (USER3) (e.g., whether or not the second user and/or the third user are logged into the service provided by OTT client 620); information indicating whether or not UE 210-2 and/or UE 210-3 are VoLTE capable (e.g., include VoLTE client 610); etc. VoLTE client 610 may store capabilities information 630 in a memory device associated with UE 210-1.

VoLTE client 610 may cause UE 210-1 to display, to the first user and via a user interface (UI) 650, OTT video/voice services available via VoLTE. VoLTE client 610 may receive, from the first user, selection of a particular one of the OTT video/voice services available via VoLTE. For example, the first user may select OTT client 620 as the particular OTT video/voice service. OTT client 620 may cause UE 210-1 to display a list of contacts associated with OTT client 620 and with the first user. OTT client 620 may receive, from the first user, a selection of a contact from the list of contacts. In one example, the first user may select the second user from the list of contacts. VoLTE client 610 may retrieve capabilities information 630 (e.g., from the memory associated with UE 210-1), and may determine network capabilities of UE 210-2, associated with the selected second user, based on capabilities information 630.

Since UE 210-2 includes VoLTE client 610, VoLTE client 610 of UE 210-1 may determine that UE 210-2 is a VoLTE capable device. If the first user wishes to generate an OTT video and/or voice call with the second user, VoLTE client 610 may cause UE 210-1 to provide a non-transcoded video/voice call 640 to UE 210-2 via LTE network 220 and IMS network 230. In one example, non-transcoded video/voice call 640 may include a particular video/voice codec that may be received and processed by VoLTE client 610 of UE 210-2. LTE network 220 and IMS network 230 may utilize significantly less network resources to route non-transcoded video/voice call 640 than is typically used to route such calls. VoLTE clients 620 of UE 210-1 and UE 210-2 may utilize less data (e.g., bits) and may provide improved QoS for non-transcoded video/voice call 640 than is typically utilized and provided for such calls. Once non-transcoded video/voice call 640 is established between UE 210-1 and UE 210-2, OTT client 620 may cause UE 210-1 to display a live video (e.g., via user interface 650) of the second user, and to provide a live voice of the second user to the first user. Similarly, OTT client 620 may cause UE 210-2 to display a live video of the first user (e.g., via a user interface 660), and to provide a live voice of the first user to the second user.

Alternatively, or additionally, the first user may select the third user from the list of contacts. VoLTE client 610 of UE 210-1 may determine network capabilities of UE 210-3, associated with the selected third user, based on capabilities information 630. Since UE 210-3 does not include VoLTE client 610, VoLTE client 610 of UE 210-1 may determine that UE 210-3 is a non-VoLTE capable device. If the first user wishes to generate an OTT video/voice call with the third user, VoLTE client 610 may cause UE 210-1 to provide a non-transcoded video/voice call 670 to UE 210-3 via LTE network 220, gateway 240, and access network 250. Gateway 240 may receive non-transcoded video/voice call 670, and may generate a transcoded video/voice call 680 that may be processed by OTT client 620 of UE 210-3. Once the video/voice call is established between UE 210-1 and UE 210-3, OTT client 620 may cause UE 210-1 to display a live video (e.g., via user interface 650) of the third user, and to provide a live voice of the third user to the first user. Similarly, OTT client 620 may cause UE 210-3 to display a live video of the first user (e.g., via a user interface 690), and to provide a live voice of the first user to the third user.

Although FIG. 6 shows example components of environment portion 600, in other implementations, environment portion 600 may include fewer components, different components, differently arranged components, or additional components than depicted in FIG. 6. Alternatively, or additionally, one or more components of environment portion 600 may perform one or more other tasks described as being performed by one or more other components of environment portion 600.

FIGS. 7A-7D are diagrams of an example user interface 700 that may be generated or provided by UE 210. User interface 700 may include a graphical user interface (GUI) or a non-graphical user interface, such as a text-based interface. User interface 700 may provide information to users via a customized interface (e.g., a proprietary interface) and/or other types of interfaces (e.g., a browser-based interface, etc.). User interface 700 may receive user inputs via one or more input devices (e.g., display 310, FIG. 3), may be user-configurable (e.g., a user may change the size of user interface 700, information displayed in user interface 700, color schemes used by user interface 700, positions of text, images, icons, windows, etc., in user interface 700, etc.), and/or may not be user-configurable. Information associated with user interface 700 may be selected and/or manipulated by a user of UE 210 (e.g., via a touch screen display, a mouse, a keyboard, a keypad, voice commands, etc.).

Figure 7:
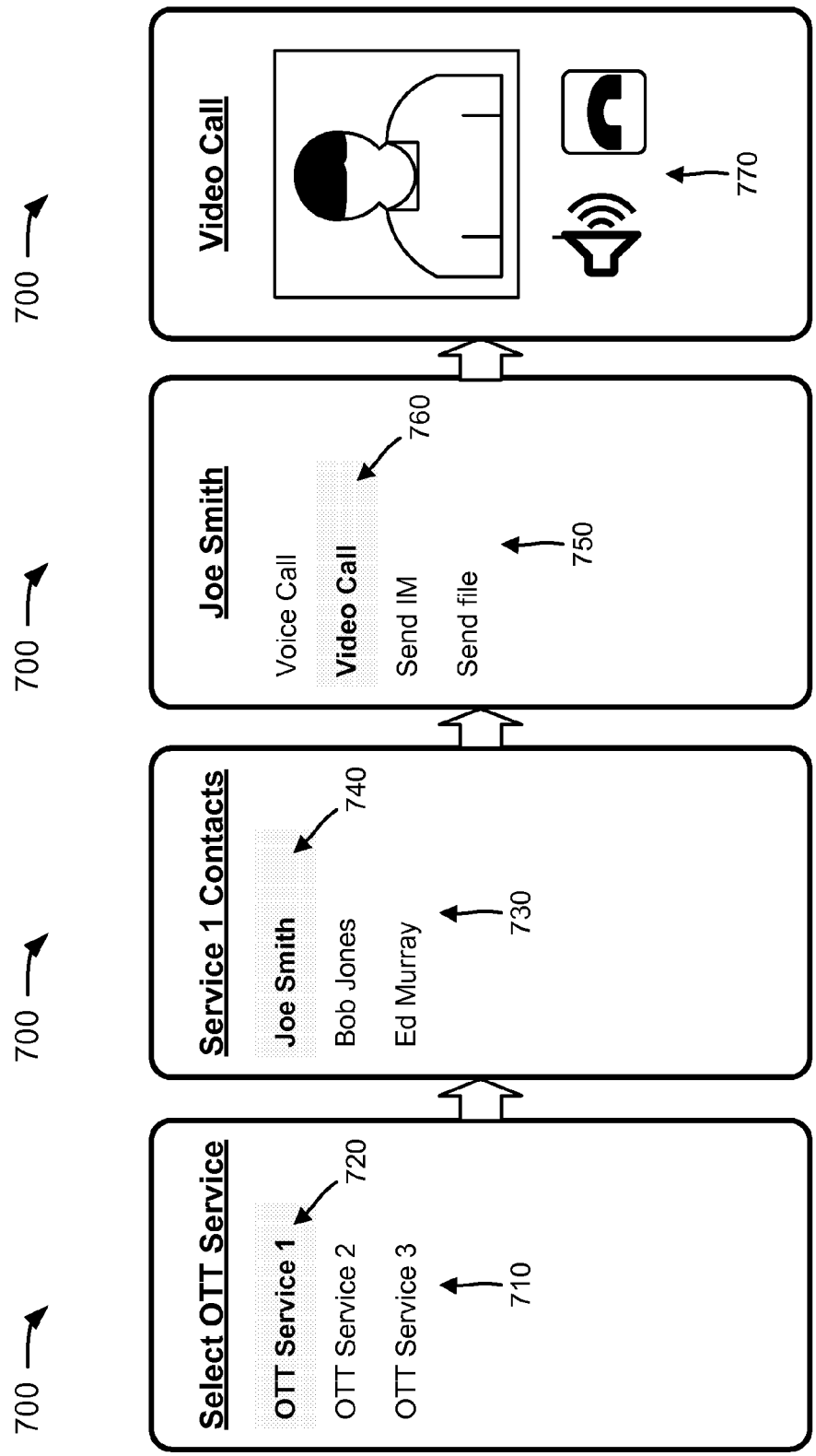
FIGS. 7A-7D are diagrams of an example user interface that may be generated or provided by the UE.

As shown in FIG. 7A, user interface 700 may enable the user of UE 210 to select an OTT service from a list 710 of OTT services. The OTT services provided in list 710 may include one or more OTT video/voice services, such as Skype, Google Voice, FaceTime, Tango, and/or other services that enable users (e.g., via UEs 210) to communicate with other users by voice, video, videoconferencing, instant messaging, and/or file transferring over the Internet. For example, as shown in FIG. 7A, list 710 may include OTT Service 1, OTT Service 2, OTT Service 3, etc. In this example, the user may select OTT Service 1, as indicated by reference number 720, from list 710 of OTT services.

Selection of OTT Service 1 by the user may cause UE 210 to display user interface 700 of FIG. 7B. As shown in FIG. 7B, user interface 700 may enable the user of UE 210 to select a contact from a list 730 of contacts. The contacts provided in list 730 may include contacts that the user has associated with OTT Service 1. List 730 of contacts may provide a name of each contact, status information associated with each contact (e.g., available, unavailable, online, offline, etc.), and/or other information associated with each contact (e.g., a telephone number, a picture, etc.). For example, as shown in FIG. 7B, list 730 of contacts may include Joe Smith, Bob Jones, Ed Murray, etc. In this example, the user may select Joe Smith, as indicated by reference number 740, from list 730 of contacts.

Selection of Joe Smith by the user may cause UE 210 to display user interface 700 of FIG. 7C. As shown in FIG. 7C, user interface 700 may enable the user of UE 210 to select an OTT operation from a list 750 of OTT operations. The OTT operations provided in list 750 may include operations that OTT Service 1 may enable the user to perform. List 750 of OTT operations may include information describing the operations that may be provided by OTT Service 1. For example, as shown in FIG. 7C, list 750 of OTT operations may include a voice call option, a video call option, a send Instant Message (IM) option, a send file option, etc. In this example, the user may select the video call option, as indicated by reference number 760, from list 750 of OTT operations.

Selection of the video call option by the user may cause UE 210 to establish a video call with Joe Smith's UE. As described above, UE 210 may determine network capabilities of Joe Smith's UE based on capabilities information 630 (FIG. 6). For example, UE 210 may determine that Joe Smith's UE is a VoLTE capable device or a non-VoLTE capable device. UE 210 may provide the video call to Joe Smith's UE in a manner that is based on whether Joe Smith's UE is a VoLTE capable device or a non-VoLTE capable device. Once the video call is established between UE 210 and Joe Smith's UE, UE 210 may display a live video of Joe Smith, and may provide a live voice of Joe Smith to the user, as indicated by reference number 770 in user interface 700 of FIG. 7D.

Although user interface 700 depicts a variety of information, in other implementations, user interface 700 may depict less information, different information, differently arranged information, and/or additional information than depicted in FIGS. 7A-7D. In one example implementation, microphone 330 (FIG. 3) may be utilized by the user of UE 210 to provide voice commands to UE 210. The voice commands may be used in place of and/or in addition to the user inputs described above in connection with FIGS. 7A-7D.

Figure 8:
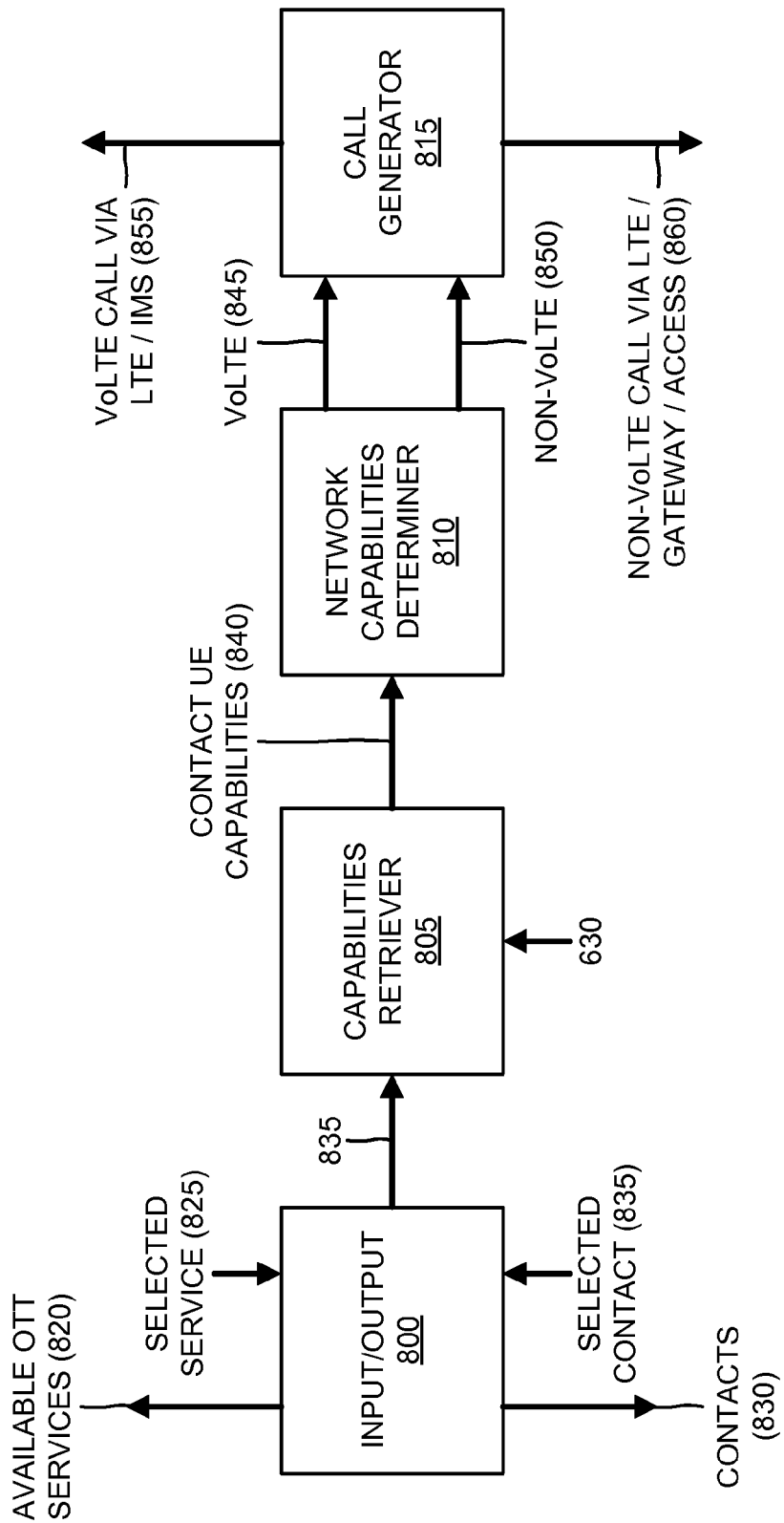
FIG. 8 is a diagram of example functional components of the UE.

FIG. 8 is a diagram of example functional components of UE 210. In one implementation, the functions described in connection with FIG. 8 may be performed by one or more components of UE 210 depicted in FIG. 3. As shown in FIG. 8, UE 210 may include an input/output component 800, a capabilities retriever 805, a network capabilities determiner 810, and a call generator 815.

Input/output component 800 may display, to a user, information identifying OTT video/voice services available via VoLTE, as indicated by reference number 820, and may receive, from the user, information identifying a selected OTT video/voice service 825. Input/output component 800 may display, to the user, information identifying contacts 830 associated with selected OTT video/voice service 825, and may receive, from the user, information identifying a selected contact 835 from the displayed contacts 830. Input/output component 800 may provide the information identifying selected contact 835 to capabilities retriever 805.

Capabilities retriever 805 may receive the information identifying selected contact 835, and may retrieve capabilities information 630 (e.g., from the memory associated with UE 210-1). Capabilities retriever 805 may determine capabilities 840 of a UE associated with selected contact 835 based on capabilities information 630, and may provide capabilities 840 to network capabilities determiner 810. Capabilities 840 may include device information (e.g., OTT services enabled in the UE, hardware provided in the UE, etc.) associated the UE of selected contact 835, network capabilities associated with the UE of selected contact 835, etc.

Network capabilities determiner 810 may receive capabilities 840, and may determine network capabilities associated with the UE of selected contact 835, based on capabilities 840. For example, network capabilities determiner 810 may determine that the UE of selected contact 835 is a VoLTE capable device, as indicated by reference number 845. Alternatively, network capabilities determiner 810 may determine that the UE of selected contact 835 is a non-VoLTE capable device, as indicated by reference number 850. Network capabilities determiner 810 may provide VoLTE capable device indication 845 or non-VoLTE capable device indication 850 to call generator 815.

If call generator 815 receives VoLTE capable device indication 845 and the user wishes to generate an OTT video/voice call with the UE of selected contact 835, call generator 815 may provide a VoLTE call, to the UE of selected contact 835, via LTE network 220 and IMS network 230, as indicated by reference number 855. Alternatively, if call generator 815 receives non-VoLTE capable device indication 850 and the user wishes to generate an OTT video/voice call with the UE of selected contact 835, call generator 815 may provide a non-VoLTE call, to the UE of selected contact 835, via LTE network 220, gateway 240, and access network 230, as indicated by reference number 860.

Although FIG. 8 shows example functional components of UE 210, in other implementations, UE 210 may include fewer functional components, different functional components, differently arranged functional components, or additional functional components than depicted in FIG. 8. Additionally, or alternatively, one or more functional components of UE 210 may perform one or more other tasks described as being performed by one or more other functional components of UE 210.

Figure 9:
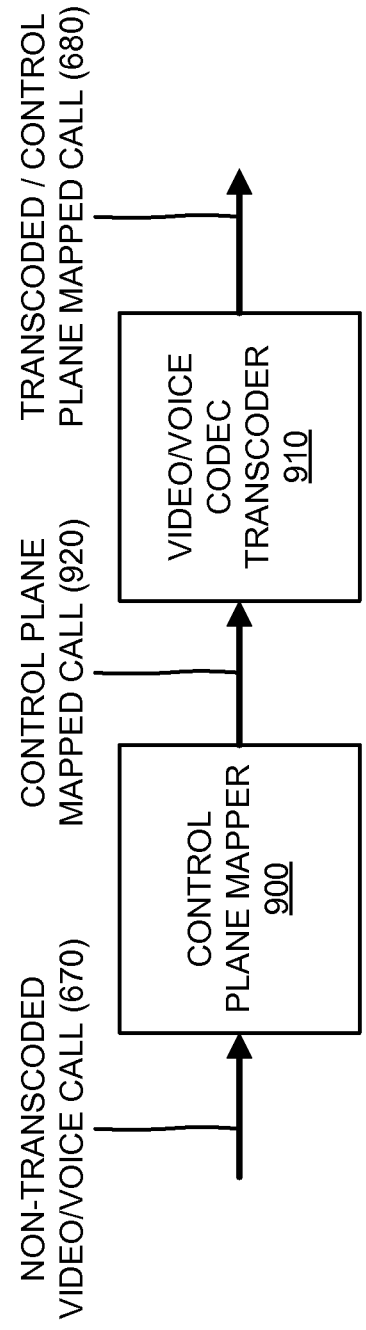
FIG. 9 is a diagram of example functional components of the gateway.

FIG. 9 is a diagram of example functional components of gateway 240. In one implementation, the functions described in connection with FIG. 9 may be performed by one or more components of device 500 (FIG. 5) or by one or more devices 500. As shown in FIG. 9, gateway 240 may include a control plane mapper 900 and a video/voice codec transcoder 910.

Control plane mapper 900 may receive non-transcoded video/voice call 670 (FIG. 6), and may perform control plane mapping on non-transcoded video/voice call 670 to produce a control plane mapped call 920. In one implementation, control plane mapper 900 may create a network mapping or routing (e.g., via a routing table) that defines what to do with packets associated with non-transcoded video/voice call 670. The routing table may include a list of destination addresses and outgoing interface(s) associated with the destination addresses. For example, control plane mapper 900 may define a network routing that alters non-transcoded video/voice call 670 (e.g., to create control plane mapped call 920) so that the call is routed to UE 210-3 via access network 250 (not shown in FIG. 9). Control plane mapper 900 may provide control plane mapped call 920 to video/voice codec transcoder 910.

Video/voice codec transcoder 910 may receive control plane mapped call 920, and may transcode call 920 to produce transcoded/control plane mapped call 680. In one implementation, video/voice codec transcoder 910 may transcode call 920 with a codec (e.g., a computer program capable of encoding or decoding a digital data stream or signal) that may be interpreted and/or processed by UE 210-3. As further shown in FIG. 9, video/voice codec transcoder 910 may provide transcoded/control plane mapped call 680 to UE 210-3 via access network 250.

Although FIG. 9 shows example functional components of gateway 240, in other implementations, gateway 240 may include fewer functional components, different functional components, differently arranged functional components, or additional functional components than depicted in FIG. 9. Additionally, or alternatively, one or more functional components of gateway 240 may perform one or more other tasks described as being performed by one or more other functional components of gateway 240.

Figure 10:
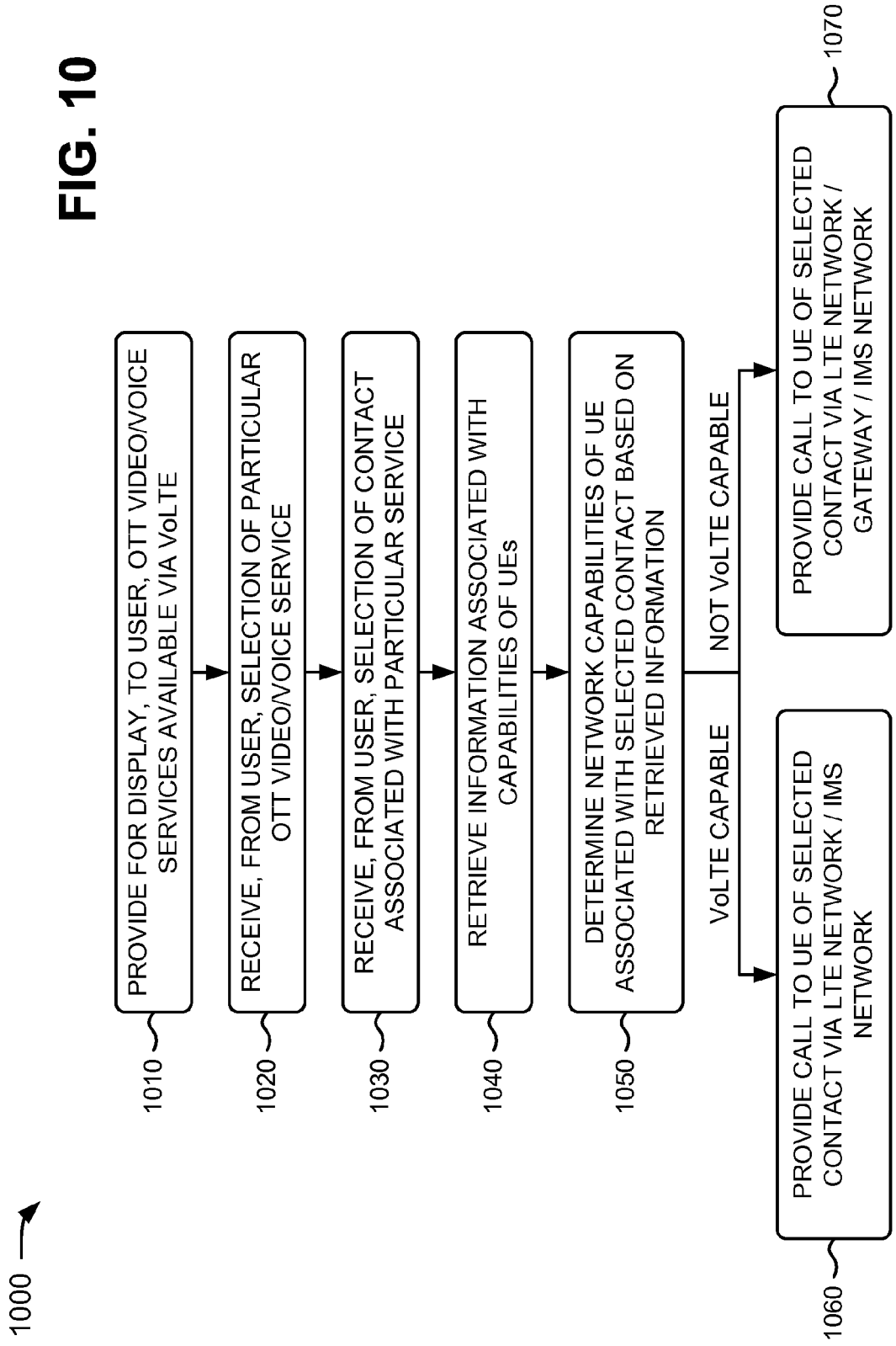
FIG. 10 is a flow chart of an example process for configuring OTT video/voice content.

FIG. 10 is a flow chart of an example process 1000 for configuring OTT video/voice content. In one implementation, process 1000 may be performed by UE 210. Alternatively, or additionally, some or all of process 1000 may be performed by another device or group of devices, including or excluding UE 210.

As shown in FIG. 10, process 1000 may include providing for display, to a user, OTT video/voice services available via VoLTE (block 1010), and receiving, from the user, a selection of a particular OTT video/voice service (block 1020). For example, in an implementation described above in connection with FIG. 6, UE 210-1 may be associated with a first user (USER1), and may include VoLTE client 610 and OTT client 620. VoLTE client 610 may include a mechanism that enables UE 210-1 to offer one or more OTT video/voice services (e.g., OTT clients 620) via LTE-based network resources (e.g., resources associated with LTE network 220, IMS network 230, etc.). OTT client 620 may enable UE 210-1 to perform one or more OTT video/voice services. VoLTE client 610 may cause UE 210-1 to display, to the first user and via user interface 650, OTT video/voice services available via VoLTE. VoLTE client 610 may receive, from the first user, selection of a particular one of the OTT video/voice services available via VoLTE.

As further shown in FIG. 10, process 1000 may include receiving, from the user, a selection of a contact associated with the particular OTT video/voice service (block 1030), and retrieving information associated with capabilities of UEs (block 1040). For example, in an implementation described above in connection with FIG. 6, OTT client 620 may cause UE 210-1 to display a list of contacts associated with OTT client 620 and with the first user. OTT client 620 may receive, from the first user, a selection of a contact from the list of contacts. VoLTE client 610 may retrieve capabilities information 630 (e.g., from the memory associated with UE 210-1).

Returning to FIG. 10, process 1000 may include determining network capabilities of a UE associated with the selected contact based on the retrieved information (block 1050). For example, in an implementation described above in connection with FIG. 6, VoLTE client 610 may determine network capabilities of UE 210-2, associated with the selected second user, based on capabilities information 630. In one example, VoLTE client 610 may determine whether UE 210-2 is a VoLTE capable device or a non-VoLTE capable device.

As further shown in FIG. 10, if the UE associated with the selected contact is a VoLTE capable device (block 1050—VoLTE CAPABLE), process 1000 may include providing a call to the UE of the selected contact via a LTE network and an IMS network (block 1060). For example, in an implementation described above in connection with FIG. 6, since UE 210-2 includes VoLTE client 610, VoLTE client 610 of UE 210-1 may determine that UE 210-2 is a VoLTE capable device. If the first user wishes to generate an OTT video and/or voice call with the second user, VoLTE client 610 may cause UE 210-1 to provide non-transcoded video/voice call 640 to UE 210-2 via LTE network 220 and IMS network 230.

Returning to FIG. 10, if the UE associated with the selected contact is a non-VoLTE capable device (block 1050—NOT VoLTE CAPABLE), process 1000 may include providing the call to the UE of the selected contact via the LTE network, a gateway, and an access network (block 1070). For example, in an implementation described above in connection with FIG. 6, since UE 210-3 does not include VoLTE client 610, VoLTE client 610 of UE 210-1 may determine that UE 210-3 is a non-VoLTE capable device. If the first user wishes to generate an OTT video/voice call with the third user, VoLTE client 610 may cause UE 210-1 to provide non-transcoded video/voice call 670 to UE 210-3 via LTE network 220, gateway 240, and access network 250. Gateway 240 may receive non-transcoded video/voice call 670, and may generate a transcoded video/voice call 680 that may be processed by OTT client 620 of UE 210-3.

Figure 11:
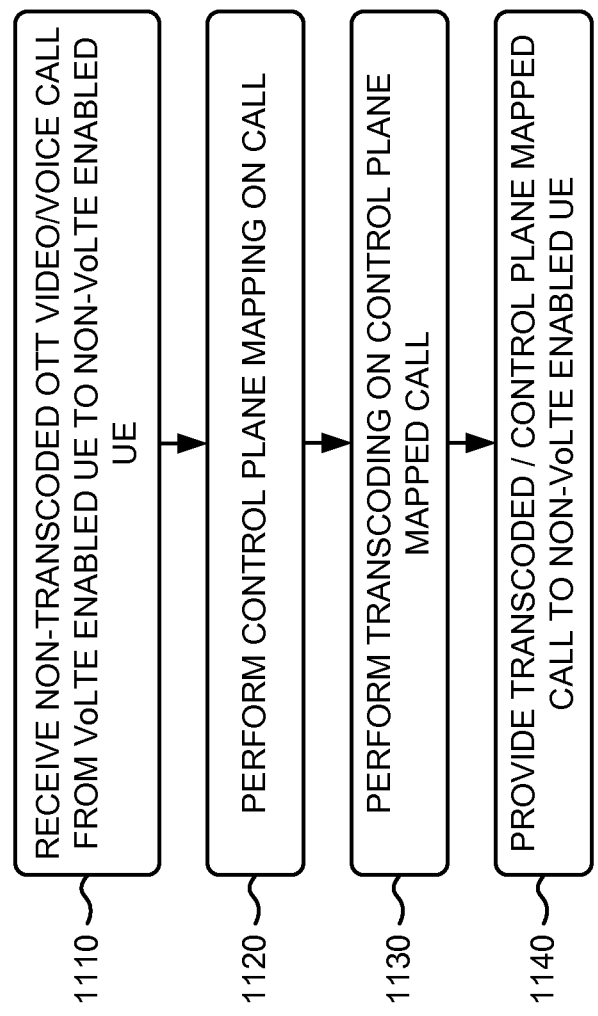
FIG. 11 is a flow chart of another example process for configuring OTT video/voice content.

FIG. 11 is a flow chart of another example process 1100 for configuring OTT video/voice content. In one implementation, process 1100 may be performed by gateway 240. Alternatively, or additionally, some or all of process 1100 may be performed by another device or group of devices, including or excluding gateway 240.

As shown in FIG. 11, process 1100 may include receiving a non-transcoded OTT video/voice call from a VoLTE enabled UE to a non-VoLTE enabled UE (block 1110), and performing control plane mapping on the non-transcoded OTT video/voice call (block 1120). For example, in an implementation described above in connection with FIG. 9, control plane mapper 900 of gateway 240 may receive non-transcoded video/voice call 670, and may perform control plane mapping on non-transcoded video/voice call 670 to produce control plane mapped call 920. Control plane mapper 900 may provide control plane mapped call 920 to video/voice codec transcoder 910.

As further shown in FIG. 11, process 1100 may include performing transcoding on the control plane mapped call (block 1130), and providing the transcoded and control plane mapped call to the non-VoLTE enabled UE (block 1140). For example, in an implementation described above in connection with FIG. 9, video/voice codec transcoder 910 of gateway 240 may receive control plane mapped call 920, and may transcode call 920 to produce transcoded/control plane mapped call 680. Video/voice codec transcoder 910 may provide transcoded/control plane mapped call 680 to UE 210-3 via access network 250.

Systems and/or methods described herein may enable a UE to provide a variety of OTT video/voice calling services via a VoLTE client residing on the UE. The VoLTE client may ensure that an OTT video/voice call is routed using VoLTE network resources provided by a LTE network and an IMS network. The VoLTE network resources may utilize significantly less resources to route the OTT video/voice call than is typically used to route such calls. The VoLTE client may utilize less data (e.g., bits) and may provide improved QoS for the OTT video/voice call than is typically used for OTT video/voice calls.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 10 and 11, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential to the invention unless explicitly described as such. Also, as used herein, the articles "a" and "an" are intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   providing, by a device and for display to a user, information identifying available over-the-top (OTT) services provided via voice-over-Long-Term Evolution (VoLTE);
   receiving, by the device and from the user, a selection of a particular OTT service of the available OTT services;
   receiving, by the device and from the user, information identifying a selected contact associated with the particular OTT service;
   retrieving, by the device, information associated with capabilities of user equipment (UE) capable of communicating with the device via the particular OTT service;
   determining, by the device and based on the retrieved capabilities information, network capabilities of a particular user equipment (UE) associated with the selected contact; and
   selectively providing, by the device, a call to the particular UE,
     the call being provided, in a first format, to the particular UE via an LTE network and an Internet protocol (IP) Multimedia Subsystem (IMS) network when the network capabilities of the particular UE indicate that the particular UE is VoLTE capable, and
     the call being provided in the first format to the LTE network, transcoded to create a second format, and provided to the UE in the second format when the network capabilities of the particular UE indicate that the particular UE is not VoLTE capable.

2. The method of claim 1, where the call is provided, in the second format, to the particular UE via a gateway and an access network.

3. The method of claim 2, where the gateway performs transcoding and control plane mapping on the call so that call is routed to and processed by the particular UE.

4. The method of claim 1, where the device comprises a user equipment (UE).

5. The method of claim 1, where the OTT services include OTT video and voice services.

6. The method of claim 1, further comprising:
   providing, for display to the user, a list of contacts associated with the particular OTT service; and
   receiving, from the user, the information identifying the selected contact based on the list of contacts associated with the particular OTT service.

7. The method of claim 1, where the call includes an OTT video and voice call.

8. A device comprising:
   a memory to store instructions; and
   a processor to execute the instructions to:
     provide, for display to a user, information identifying available over-the-top (OTT) services provided via voice-over-Long-Term Evolution (VoLTE);

receive, from the user, a selection of a particular OTT service of the available OTT services;
receive, from the user, information identifying a selected contact associated with the particular OTT service;
determine whether a particular user equipment (UE) associated with the selected contact is a VoLTE capable device or a non-VoLTE capable device;
selectively provide a call to the particular UE,
the call being provided, in a first format, to the particular UE via an LTE network and an Internet protocol (IP) Multimedia Subsystem (IMS) network when the particular UE is a VoLTE capable device, and
the call being provided in the first format to the LTE network, transcoded to create a second format, and provided to the UE in the second format when the particular UE is a non-VoLTE capable device.

9. The device of claim 8, where the call is provided, in the second format, to the particular UE via a gateway and an access network.

10. The device of claim 9, where the gateway performs transcoding and control plane mapping on the call so that call is routed to and processed by the particular UE.

11. The device of claim 8, where the device comprises a user equipment (UE).

12. The device of claim 8, where the OTT services include OTT video and voice services.

13. The device of claim 8, where the processor is further to:
provide, for display to the user, a list of contacts associated with the particular OTT service, and
receive, from the user, the information identifying the selected contact based on the list of contacts associated with the particular OTT service.

14. The device of claim 8, where the call includes an OTT video and voice call.

15. A non-transitory computer-readable medium storing instructions, the instructions comprising:
one or more instructions that, when executed by a processor of a device, cause the processor to:
provide, for display to a user, information identifying available over-the-top (OTT) services provided via voice-over-Long-Term Evolution (VoLTE);
receive, from the user, a selection of a particular OTT service of the available OTT services;
receive, from the user, information identifying a selected contact associated with the particular OTT service;
determine whether a particular user equipment (UE) associated with the selected contact is a VoLTE capable device or a non-VoLTE capable device; and
selectively provide a call to the particular UE,
the call being provided, in a first format, to the particular UE via an LTE network and an Internet protocol (IP) Multimedia Subsystem (IMS) network when the particular UE is a VoLTE capable device, and
the call being provided in the first format to the LTE network, transcoded to create a second format, and provided to the UE in the second format when the particular UE is a non-VoLTE capable device.

16. The computer-readable medium of claim 15, where the call is provided, in the second format, to the particular UE via a gateway and an access network.

17. The computer-readable medium of claim 16, where the gateway performs transcoding and control plane mapping on the call so that call is routed to and processed by the particular UE.

18. The computer-readable medium of claim 15, further comprising:
one or more instructions that, when executed by the processor, cause the processor to:
provide, for display to the user, a list of contacts associated with the particular OTT service, and
receive, from the user, the information identifying the selected contact based on the list of contacts associated with the particular OTT service.

19. The computer-readable medium of claim 15, where the call includes an OTT video and voice call.

20. A method comprising:
receiving, by a device, an over-the-top (OTT) video and voice call from a voice-over-Long-Term Evolution (VoLTE) enabled user equipment (UE);
performing, by the device and when the OTT video and voice call is destined for a non-VoLTE enabled UE, control plane mapping on the OTT video and voice call to route the OTT video and voice call to an access network associated with the non-VoLTE enabled UE;
performing, by the device, transcoding on the OTT video and voice call so that the OTT video and voice call is capable of being processed by the non-VoLTE enabled UE; and
routing, by the device and based on the control plane mapping, the transcoded OTT video and voice call to the non-VoLTE enabled UE via the access network,
the OTT video and voice call being routed, when the OTT video and voice call is destined for a VoLTE enabled UE, to the VoLTE enabled UE without transcoding the OTT video and voice call.

* * * * *